(No Model.)
C. E. CANFIELD.
TRUCK FRAME FOR MOTOR CARS.
No. 511,680. Patented Dec. 26, 1893.
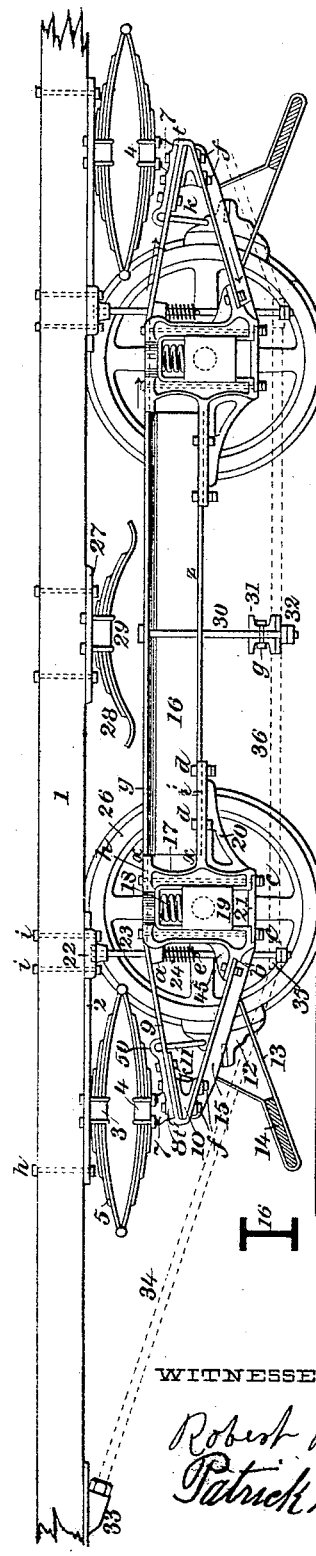
WITNESSES:
Robert B. Foyer
Patrick H. McCarthy
INVENTOR,
C. ERNEST CANFIELD,
BY Franklin Scott, ATTORNEY.
THE NATIONAL LITHOGRAPHING COMPANY,
WASHINGTON, D. C.

UNITED STATES PATENT OFFICE.

CHARLES ERNEST CANFIELD, OF CHESTER, PENNSYLVANIA, ASSIGNOR OF ONE-HALF TO HENRY COCHRAN, OF SAME PLACE.

TRUCK-FRAME FOR MOTOR-CARS.

SPECIFICATION forming part of Letters Patent No. 511,680, dated December 26, 1893.

Application filed June 21, 1893. Serial No. 478,317. (No model.)

*To all whom it may concern:*

Be it known that I, CHARLES ERNEST CANFIELD, of the city of Chester, in the State of Pennsylvania, have invented certain new and useful Improvements in Truck-Frames for Electric-Motor and other Cars, of which the following is a specification.

This invention relates to a special construction of that part of a motor car truck frame commonly known as the "spring base" and involves a peculiar construction of the side beams and of the pedestals.

It has for its object among other things, to provide a side beam which to all practical intents and purposes, shall be integral but at the same time be elastic, and so made that in use the strains incident to heavy loading and the rocking motion attendant thereon shall be transferred from the bolts and nuts of the frame and from the joints, and be taken up and resisted by the solid and integral parts of the frame.

The drawings fully explain my invention, in which—

Figure 1 shows a side elevation of a truck with my improvements applied thereto. Fig. 2 is a plan of the same. Fig. 3 is a cross section of the girder or wheel piece which connects the pedestals of the truck. Fig. 4 is a plan of one of the cross ties. Fig. 5 is a view of the spring seat. Fig. 6 is a modification of the wheel piece and pedestal.

In this invention those parts of the truck frame commonly called the beams or wheel pieces are practically integral in character and have provisions for receiving the pedestals which are separate. The former are made of rolled wrought iron or steel, being a composite structure made up from shapes of various patterns as will appear farther on. The pedestals are of cast or malleable iron or steel of peculiar shape, and carry the axle boxes and the supporting springs in the usual way. An extended spring base is provided, upon the projecting ends of which, elliptic springs are carried, upon which rests the body of the car proper. On each side of the car in the center of its length, a buffer spring is interposed between the under side of the car and the top of the wheel piece, which, under ordinary loads, makes no bearing contact with the top of the beam, but under extraordinary depression comes to a bearing on the top of the beam and thus relieves the end springs of the whole burden and distributes it among a greater number of bearing points. Thus constructed a much easier riding car is produced in which a lighter and more elastic end spring can be employed than when all the springs have uniform bearing contacts and act simultaneously.

In the construction of my invention I provide a pedestal of the general form shown in the drawings at 17. It has two jaws or legs projecting downwardly which embrace and hold the axle-box in position as at 19. Between the top of the axle box and the under side of the jaw opening the spiral spring 18 is interposed and upon these springs rests the whole burden of the car body and its load. From the outside jaw at its lower end a bracket 45 projects having an angular notch *b* which constitutes an abutment for the end of the brace 15 of the projecting part of the side beam. On the same side near the top is a boss *a* which is bored to receive the steady rod 23 which also passes through a hole in the bracket 45. From the inside of the other jaw projects a supporting bracket 20 upon the upper surface of which rests the wheel piece 16 which is fastened thereto by the bolts *d d*. The bottom ends of the jaws are connected by the shouldered plate 21 to resist compression and to preserve a proper distention of the jaws.

The wheel piece 16 consists of a single piece or section of I beam having its web and bottom flange $z$ squared off on the line $x\ x$, at each end but leaving enough of the length of the top flange $y$ projecting at each end to extend somewhat over the top of the pedestal and afford sufficient length for welding the end of the bar 9 to it. From the center of the piece 16 the suspender rod 30 is hung which carries the beam 31 upon which the motor mechanism is placed. The bar 9 and brace 15 beneath it together constitute a cantalever extension of the wheel piece and are welded together at their outer ends so as to form practically one piece. In this case the brace is made of angle iron for greater stiffness but this may not in all cases be necessary, as any form of iron suited to the purpose may be used. A block 10 is fitted within the internal angle of the two pieces for greater rigidity and to preserve the proper shape of the parts and is held therein by the bolts $ff$. The inner end of the brace 15 is beveled at its end to fit the beveled notch at $b$, where it is bolted to the flange of the bracket 45 of the pedestal. The function of the beveled fitting is to take all the strains of compression resulting from the weight imposed on the end of the cantalever projection as well as all that due to the rocking movement of the car so common to this class of vehicles, and the shape of the bevel is such, its incline being a rising one, that the greater the strain the closer the joint will be closed.

The projecting extremities of the side beams are connected by cross-ties of the shape shown in Fig. 4. Their ends are turned at right angles, thus forming L shaped wings which afford means for attaching the tie to the side beams. These wings are attached to the under side of the projecting arm 9 as seen in Fig. 1. Upon the upper sides of the ends of the arms 9, the stand 8 is carried. This is a casting provided with a spring seat 7 to which an elliptic spring 5 is fastened by means of the clip 4. The lower end of stand 8 abuts against a transverse ledge $t$ which effectually resists all tendency of the stand to slide or work down the inclined surface of arm 9 and at the same time relieves the bolts by which the spring 5, arm 9 and cross tie 6 are bolted together, of all strain. The upper end of stand 8 terminates in a transverse eye or socket 50 which takes in the suspender link 11 which carries the brake. Each of these spring seats carries an elliptic spring 5 to the upper side of which is attached the plate frame M. This plate consists of two lateral parts which lie beneath the sill 1 of the car body and are bolted to the same, and a transverse tie, thus forming an H shaped piece, one for each end of the truck. If desired, the lateral pieces may extend the whole length of the truck frame, and not only thus strengthen the whole structure but also furnish a seat for the attachment of the buffer springs 28 in the center of the car. A steady pin socket 22 is provided for the attachment of the steadying pin 23 which is suspended by its head from a socket and is loosely fitted so as to yield to the irregular vibration of the car. This pin passes down through the projection $a$ and the bracket 45 of the pedestal and extends low enough to connect with the coupling 35 of the truss which is sometimes used to support the car body. Four of these steadying pins, one at each pedestal, or more if necessary, are provided which effectually provide against lateral or other sway of the body. The sockets 22 are bolted to the plate 2 or to the under side of the car sill. Beneath the projection $a$ and the pin $e$ which passes through the steady pin 23 a coil spring 24 is interposed, the office of which is to obviate rattling of the pin 23 in its bearings by forcing it downward.

In some cars adapted to carrying heavy loads in which the rocking motion occasions inconvenience and annoyance, two supplemental springs 28 are provided one of which is attached to the under side of the sill on either side of the car midway between the two wheels and directly over the center of the wheel piece 16. When the car is running light or with a light load, the corner springs 5 5 5 5, are sufficient to support the burden easily, and while doing so the points of the buffer springs do not find any bearing on the tops of the wheel pieces, but when the car is heavily loaded so as to greatly compress the elliptic springs at the corners, the sinking of the load will carry the body of the car down so that the points of the springs 28 will find a bearing on the top of the wheel piece, 16 thereby relieving the corner springs of a great part of the strain which otherwise would be put on them.

Each end of the truck frame is provided with a guard or fender 14 which is carried by two brackets, one at each end of the same which may be made of strap or angle iron as at 13 bent to the proper shape and attached as shown to the under side of the braces 15. These fenders and their supporting brackets each constitute a tie which unites the lower parts of the truck frame by connecting the bottom parts of the pedestals at each end of the frame.

It is not essential that the girder piece 16 be of I shape in cross section as a piece of T shape in cross section would answer the requirements in many respects equally well. The essential requisite is that there shall be sufficient vertical depth to the upright web that it will sustain the ordinary strains put upon it. The flange $z$ therefore is not regarded as indispensable. A beam like 116 of T form attached to the pedestal 17 by bolts and ears as at $d'$ $d'$ Fig. 6 would accomplish the same results. In this case I treat the I form and the T form as equivalents, the I form including the T form. Nor do I limit the number of steadying pins 23, for in some cases more than four might be necessary to maintain steadiness of the car body, in which case another set could be used between the car axles by passing through the pedestal on the side of the axle opposite that now shown.

I therefore claim as my invention—

1. The described side beam consisting of a wheel piece of I beam having its web and bottom flange squared off to fit the pedestal and its upper flange carried over the pedestal at each end and extended longitudinally sufficiently to take on a supporting spring upon which the car rests, thence doubled back and returned to the pedestal and fitted to connect therewith, and having provisions substantially as shown, for connection with the pedestals, thus forming a substantially integral piece, substantially as specified.

2. The combination of the described substantially integral side beam composed of the girder beam wheel piece with terminal cantalever extensions, the pedestals, the inner leg of each of which has a supporting brace to which the wheel piece is attached, and the shouldered plates connecting the legs of the pedestals, substantially as specified.

3. The combination of the described side beam having cantalever extensions each of which carries a supporting spring, with the car body and a pair of buffer springs one on each side of the car interposed between the under side of the car sill and the top of the side beam, said buffer springs being attached either to the car body or to the side beam, but not both and adapted to come into action only when the car is abnormally loaded or depressed, the whole being constructed and arranged to operate in connection with the car body substantially in the manner described and for the purpose set forth.

4. In a car truck, a side beam embracing a single thin wheel piece set vertically edgewise and of adequate transverse width to resist the strains imposed on it, having an arm projecting from its upper corner at each end, a brace extending from the extremity of each arm to the lower part of the pedestal, having its lower end fitted to abut against a seat fitted therefor upon the pedestal, said side beams thus constituted, being substantially integral in character, in combination with a pedestal having provisions for the attachment of said side beam thereto and a seat for supporting the end of said brace, substantially as specified.

5. The combination of the described pedestal having the supporting and bracing bracket 20 with the connecting plates 21 and the described integral side beam, substantially as specified.

6. The combination of the pedestal provided with the beveled notch $b$, with the described integral side beam having cantalever extensions embracing braces 15 with ends fitted to engage the said beveled notches, constructed and arranged to operate substantially in the manner described and for the purposes specified.

7. The combination with the described integral side beam having the cantalever extensions, of the described cross-ties 6, and the spring supporting castings 8 carrying the spring seats 7, substantially as specified.

8. The combination with the described integral side beam having the cantalever extensions, of the described cross ties 6, and the casting 8 having an eye for the reception of the brake suspender link, substantially as specified.

9. The combination of the described side beam, pedestal, shoulder plates and bolts uniting and binding the same together, whereby all the constituent parts of the side of the frame are secured by one set of bolts passing through each pedestal, substantially as specified.

10. As an improved constituent member of a car-wheel truck a side beam consisting of a central wheel-piece possessing a deep vertical web having a longitudinal horizontal flange on its upper edge, in combination with the cantalever extensions projecting from the ends of said wheel piece connected therewith, supported by braces integral with the material of the extensions and adapted to abut against the lower part of the pedestals.

In witness whereof I have hereto subscribed my name this 26th day of May, 1893.

CHARLES ERNEST CANFIELD.

In presence of—
  HENRY COCHRAN,
  CHAS. R. DAY.